United States Patent [19]
Walzer, Jr. et al.

[11] Patent Number: 6,100,214
[45] Date of Patent: Aug. 8, 2000

[54] POLYMERIC SUPPORTED CATALYSTS FOR OLEFIN POLYMERIZATION

[75] Inventors: John F. Walzer, Jr., Seabrook; Anthony J. Dias, Houston, both of Tex.; Jean M J Frechet, Oakland, Calif.; Stephen B. Roscoe, Woodbury, Minn.

[73] Assignee: Exxon Chemical Patents Inc., Houston, Tex.

[21] Appl. No.: 09/092,752

[22] Filed: Jun. 5, 1998

Related U.S. Application Data

[60] Provisional application No. 60/048,965, Jun. 6, 1997, and provisional application No. 60/079,569, Mar. 27, 1998.

[51] Int. Cl.$^7$ .............................. B01J 31/00; B01J 37/00; C08F 4/02; C08F 4/60; C08F 4/44

[52] U.S. Cl. ..................... 502/159; 502/103; 502/109; 502/117; 502/152; 502/155; 502/167; 526/141; 526/147; 526/943

[58] Field of Search .................................. 502/103, 117, 502/152, 155, 159, 167, 109; 526/141, 147

[56] References Cited

U.S. PATENT DOCUMENTS

| | | | |
|---|---|---|---|
| 4,246,134 | 1/1981 | Uvarov et al. | |
| 4,463,135 | 7/1984 | Maly . | |
| 5,362,824 | 11/1994 | Furtek et al. . | |
| 5,427,991 | 6/1995 | Turner . | |
| 5,610,115 | 3/1997 | Soga et al. . | |
| 5,627,246 | 5/1997 | Langhauser et al. | 502/117 |
| 5,643,847 | 7/1997 | Walzer, Jr. | 502/117 |
| 5,801,113 | 9/1998 | Jejelowo et al. | 502/117 |
| 5,807,938 | 9/1998 | Kaneko et al. | 502/103 |
| 5,824,620 | 10/1998 | Vega et al. | 502/117 |
| 5,834,393 | 11/1998 | Jacobsen et al. | 502/117 |
| 5,942,586 | 8/1999 | Herrmann et al. | 526/160 |

FOREIGN PATENT DOCUMENTS

| | | |
|---|---|---|
| 0 598 543 A2 | 5/1994 | European Pat. Off. . |
| 0 633 272 | 1/1995 | European Pat. Off. . |
| 0 727 443 | 8/1996 | European Pat. Off. . |
| 0 757 992 | 2/1997 | European Pat. Off. . |
| 0 767 184 | 4/1997 | European Pat. Off. . |
| WO 93/11172 | 6/1993 | WIPO . |
| WO 95/23816 | 9/1995 | WIPO . |
| WO 96/04319 | 2/1996 | WIPO . |
| WO 96/28480 | 9/1996 | WIPO . |
| WO 96/35726 | 11/1996 | WIPO . |

OTHER PUBLICATIONS

"Functionalization Of Crosslinked Polystyrene Resins By Chemical Modification: A Review," Frechet, et al, Chemistry & Properties Of Crosslinked Polymers, p. 59–83, (1977).

*Primary Examiner*—Mark L. Bell
*Assistant Examiner*—J. Pasterczyk
*Attorney, Agent, or Firm*—William G. Muller

[57] ABSTRACT

The described invention provides a low fouling, high particle density polymerization process and an olefin polymerization catalyst composition comprising the reaction product of a) an organic polymeric support i) having a surface area of from about 1 to 10 $m^2/g$ and ii) functionalized with an acidic proton-containing ammonium salt of a non-coordinating anion, and b) an organometallic transition metal compound having ancillary ligands, at least one labile ligand capable of abstraction by protonation by said ammonium salt and at least one labile ligand into which an olefinic monomer can insert for polymerization. In a preferred embodiment, the polymeric support has a surface area of $\leq 10$ $m^2/g$ and is particularly suitable for use with high activity organometallic, transition metal catalyst compounds.

16 Claims, No Drawings

POLYMERIC SUPPORTED CATALYSTS FOR OLEFIN POLYMERIZATION

RELATED APPLICATIONS

This application claims priority from earlier filed application Ser. Nos. 60/048,965, filed Jun. 6, 1997, and 60/079,569, filed Mar. 27, 1998.

TECHNICAL FIELD

This invention relates to olefin polymerization with organometallic transition metal catalysts on polymeric supports wherein the transition metal catalysts are activated for polymerization by an ionizing reaction and stabilized in cationic form with a noncoordinating anion.

BACKGROUND ART

The use of ionic catalysts for olefin polymerization where organometallic transition metal cations are stabilized in an active polymerization state by compatible, non-coordinating anions is a well-recognized field in the chemical arts. Typically such organometallic transition metal cations are the chemical derivatives of organometallic transition metal compounds having both ancillary ligands which help stabilize the compound in an active electropositive state and labile ligands at least one of which can be abstracted to render the compound cationic and at least one of which is suitable for olefin insertion. Since inert supports are used industrially for insertion polymerization processes in both of gas phase polymerization and slurry polymerization, technology for supporting these ionic catalysts is also known.

U.S. Pat. No. 5,427,991 and equivalent WO-A-93/11172 describe the chemical bonding of non-coordinating anionic activators to supports so as to prepare polyanionic activators that when used with the metallocene compounds avoid problems of catalyst desorption experienced when ionic catalysts physically adsorbed on inert supports are utilized in solution or slurry polymerization. The supports are core components of inert monomeric, oligomeric, polymeric or metal oxide supports which have been prepared so as to incorporate chemically bound, non-coordinating anions. The teaching of the preparation of polyanionic activators from hydrocarbyl compounds (FIGS. 1, 5–6) entails a number of reactions. A typical reaction for a polymeric core component is that of a treating with the lithiating agent n-BuLi, or optionally lithiating a polymerizable monomer followed by polymerization of monomers into a polymeric segment, to produce a polymer or cross-linked polymer having pendant hydrocarbyl lithium groups. These are subsequently treated with the bulky Lewis acid trisperfluorophenylboron (B(pfp)$_3$) and subjected to an ion exchange reaction with dimethylanilinium hydrochloride ([DMAH]$^+$[Cl]$^-$) so as to prepare a polymer surface having covalently linked activator groups of [DMAH]$^+$[(pfp)$_3$BP]$^-$, where P is the polymeric core component. WO 96/04319 describes a support method using the Lewis acid, noncoordinating anion precursor (e.g., trisperfluorophenyl boron) covalently bound to silica-containing supports through silanol groups, which as an initially formed activator complex donates hydroxyl group protons for protonation of the Group 4 transition metal compound to catalytically active cations.

In addition to the attachment of anionic complexes to support substrates, patent literature describes the attachment of transition metal ligand groups to polymeric supports, the ligand groups then being reacted with transition metal compounds so as to form organometallic compounds bound through cyclopentadienyl ligands to polymeric supports. Such compounds can then be rendered suitable as olefin polymerization catalysts by the use of activating cocatalyst compounds, e.g., such as alkylalumoxanes and phenylborates. See U.S. Pat. Nos. 4,463,135, 5,610,115 and WO 96/35726. WO 96/35726 in particular notes the use of an acrylate-containing, copolymer support having a surface area of less than about 15 m$^2$/g, with examples illustrating 2.1 m$^2$/g surface area. These catalysts are taught to be of benefit over metal oxide supports in requiring fewer preparation steps since polar moieties such as adsorbed water and hydroxyl groups are not typically present on the polymeric supports. However, this technology presents problems in that the preparation of the support bound ligands limits ligand selection available for subsequent bonding to the transition metal and gives rise to low reaction product yields and undesirable byproducts, some of which may either interfere or compete with subsequent reactions.

Also the functionalization of polymer resin beads for use with or preparation of heterogeneous catalytic species is known. See, e.g., Frechet, J. M. J., Farrall, M. J., "Functionalization of Crosslinked Polystyrene by Chemical Modification", *Chemistry and Properties of Crosslinked Polymers*, 59–83 (Academic Press, 1977); and, Sun, L., Shariati, A., Hsu, J. C., Bacon, D. W., *Studies in Surface Science and Catalysis* 1994, 89, 81, and U.S. Pat. No. 4,246,134, this patent describing polymeric carriers of macroporous copolymers of vinyl and divinyl monomers with specific surface areas of 30 to 700 m$^2$/g. and the use of such for vinyl monomer polymerization.

The use of supported or heterogeneous catalysts in gas phase polymerization is important as a means of increasing process efficiencies by assuring that the forming polymeric particles achieve shape and density that improves reactor operability and ease of handling. Ineffective catalyst supports permit the production of polymeric fines and resulting fouling of reactor walls or piping. This appears to be due to a number of possible reasons, including premature support particle fragmentation or catalyst desorption both of which can lead to decrease in the control of polymerization. Polymer particle size and density can be degraded and efficiencies lost. Additionally, ionic catalysts provide significant industrial advantages in reducing the amounts of cocatalyst needed and in often providing safer and cheaper synthesis of those cocatalyst activator compounds. These catalysts however can be highly sensitive to polar impurities and accordingly methods of catalyst synthesis that can reduce the production of potential interfering byproducts are desirable.

SUMMARY OF THE INVENTION

The invention provides a low fouling, high particle density polymerization process and an olefin polymerization catalyst composition comprising the reaction product of a) a polymeric support i) having a surface area of from about 1 to 400 m$^2$/g and ii) functionalized with a protonated ammonium salt of a noncoordinating anion, and b) an organometallic transition metal compound having ancillary ligands, at least one labile ligand capable of abstraction by protonation by said ammonium salt and at least one labile ligand into which an olefinic monomer can insert for polymerization. The invention also includes the intermediate, functionalized support wherein the polymeric support contains a covalently bound protonated ammonium salt of a noncoordinating anion, said anion being capable of stabilizing a catalytically active transition metal cation. In a preferred embodiment, the polymeric support has a surface area of ≦10 m$^2$/g and is particularly suitable for use with high activity organometallic, transition metal catalyst compounds.

DESCRIPTION OF THE INVENTION

The functionalized polymeric support according to the invention is a stable polymeric supported activator that can be washed, stored, shipped or otherwise handled prior to introduction of the organometallic transition metal compounds without deleterious effects on its ability to activate by protonation those compounds and facilitate their essentially uniform placement throughout the polymeric, resin supports. It comprises a protonated ammonium salt functionality covalently bound to the polymeric support, the salt functionality comprising an ammonium-based cation and a noncoordinating anion.

The nitrogen atom of the protonated ammonium salt functionality of the invention polymeric support is substituted with one to three groups at least one of which links the ammonium functionality to the polymeric support as represented by the formula A:

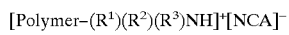

[Polymer-$(R^1)(R^2)(R^3)$NH]$^+$[NCA]$^-$      A where $R^1$, $R^2$ and $R^3$ in formula A may be the same or different and are selected from the groups consisting of: hydrogen, hydrocarbyl, and a substituted hydrocarbyl where at least one of $R^1$, $R^2$ and $R^3$ is not hydrogen. Preferably, $R^1$, $R^2$ and $R^3$ contain from 1 to 30 carbon atoms, more preferably 1 to 20 Also, for the purposes of this application, the term "substituted hydrocarbyl" means a hydrocarbyl radical wherein one or more of the hydrogen atoms of the hydrocarbyl radical $R^1$, $R^2$ and $R^3$ are replaced by a member of the groups selected from: halogen, a substantially hydrocarbyl group containing from 1 to 3 heteroatoms selected from the group consisting of N, O, S, and P; a hydrocarbyl substituted organometalloid; a halogen substituted organometalloid; and an organometalloid substituted with at least one substantially hydrocarbyl group containing from 1 to 3 heteroatoms selected from the group consisting of N, O, S, and P. NCA refers to a compatible "noncoordinating anion".

The $R^1$, $R^2$ and $R^3$ groups of the ammonium salts of the invention will include those wherein two or three R groups are joined so as to form an alicylic or aromatic ring having a ring nitrogen atom, see for example the following compounds.

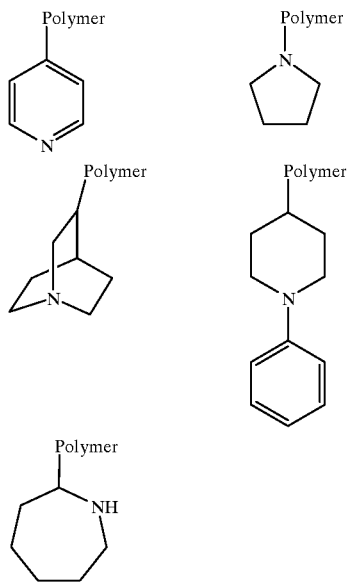

The term noncoordinating anion as used for the invention compounds is art recognized to mean an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the complexes between them and the transition-metal cationic catalyst compounds are formed. Further, the anion will not transfer an anionic substituent or fragment to the cation so as to cause it to form a neutral four coordinate metal compound and a neutral by-product from the anion. Noncoordinating anions useful in accordance with this invention are those which are compatible, stabilize the invention transition metal cation in the sense of balancing its ionic charge, yet retain sufficient lability to permit displacement by an olefinically unsaturated monomer during polymerization. Additionally, the anions useful in this invention will be of sufficient molecular size to partially inhibit or help to prevent neutralization of the invention transition-metal cation by Lewis bases other than the polymerizable monomers that may be present in the polymerization process. Suitable noncoordinating anions are described in U.S. Pat. Nos. 5,198,401, 5,278,119, 5,407,884, 5,599,761, preferably they will be the labile proton-containing, nitrogen-based salts of metal or metalloid compounds described in these documents. Organoboron and organoaluminum salts are preferred. All documents are incorporated by reference for purposes of U.S. patent practice.

The invention olefin polymerization catalyst composition is the product of the reaction achieved by contacting A with essentially any organometallic transition metal compound that is suitable for olefin polymerization when activated by protonation with the polymeric supported activator of the invention. This product is a supported ionic catalyst composition having an organometallic transition metal cation and a complementary noncoordinating anion, this composition being homogeneously dispersed in the polymeric support matrix. Additionally, without intending to being bound hereby, it is believed that there exists a dative interaction between said transition metal cation and the amine functionality of the polymeric support matrix. The strength of this interaction should depend on the Lewis acidity of the transition metal cation and especially the Lewis basicity of the amine functionality. This interaction would act to reduce any tendency of the ionic catalyst species to desorb from the polymeric support matrix. It will be noted that extremely strong Lewis bases and/or Lewis bases with minimal steric bulk are known to strongly coordinate to the vacant coordination site at the cationic metal center (e.g., pyridine). In general, this means that secondary amines are preferred over primary amines.

The contacting should be conducted so as to permit permeation of the organometallic transition metal compound into the matrix of the polymeric support and thus is preferably conducted by treating the supported activator particles with a solution of the organometallic transition metal compound. Suitable solvents for the organometallic transition metal compounds may be aliphatic or aromatic, depending upon the ligation, the chemical composition of the support material, and the degree of crosslinking of the support. Toluene and hexane are typical. It is particularly desirable to use a solvent to swell the support when it has a surface area at or below about 50 M$^2$/g. The temperature and pressure of the contacting can vary so long as the reactants, solvents and the carrier are neither degraded nor rendered unreactive. Ambient conditions are suitable. The resulting activation by protonation and stabilization with the noncoordinating anions is well known, by analogy, for organometallic transition metal compounds suitable for olefin polymerization, see for example, U.S. Pat. Nos. 5,198,401, 5,278,119 and WO 96/04319 for descriptions of the mechanisms involved. All documents are incorporated by reference for purposes of U.S. patent practice.

The polymeric support typically comprises an essentially hydrocarbon polymeric compound, preferably of sufficiently low surface area so as to avoid excessive monomer access to the active catalyst sites, which sites are essentially uniformly distributed throughout the mass of the support by virtue of the randomly incorporated functional groups on the polymeric chains making up the support. The term low surface area means a surface area of $\leq 10$ m$^2$/g as measured a single point nitrogen B.E.T. (Brunauer, S., Emmet, P. H., Teller, E., *JACS* 1938, 60, 309) and can be exemplified by the use of polystyrene based beads or gels. These beads or gels are lightly cross-linked and randomly functionalized with the ammonium salt compounds. Important features of these catalyst support compounds is insolubility in the solvents used in preparing the supported catalysts or in its use in polymerizing monomers, the particle size as related to effectiveness for use in fluidized bed reactors, and overall resistance to fracture under temperature pressure and loading requirements. Thus the support must be insoluble under normal polymerization operating conditions. Preferably the beads are in the form of spheres of uniform dimension and having a normal size range between 400 and 100 US Mesh sizing (30 to 100 micrometers).

Suitable supports can be derived in the form of homogeneous crosslinked polymers and are the most preferable for this invention. Suitable functionalized, essentially hydrocarbon polymeric supports or carriers can be obtained commercially, e.g., polystyrene beads or gels, or prepared synthetically in accordance with general knowledge in the art, see for example the Background art above. Synthesis generally consists of the copolymerization of vinyl monomers with comonomers having functionalization suitable for nucleophilic substitution by the ammonium salts of the invention either by direct copolymerization or by copolymerization and subsequent chemical reaction derivation that places the appropriate functional groups on the hydrocarbon polymeric chains making up the supports. Specific exemplification is provided by polystyrene-divinylbenzene copolymer gels or beads. The relative strength, resistance to fracture, is provided by the weight % content of divinylbenzene (DVB) comonomer, commercially available products contain from 2 to 20 wt. % DVB. The higher ranges of DVB, e.g., 10 to 20 wt. %, provide additional strength but the resulting additional crosslinking hinders kinetics by making the bead resistant to the shrinking and swelling necessary to normal polymerization operations. The effective porosity is adjustable by selection of divinylbenzene content. For example, DVB contents of 5 to 10 wt. % can yield restricted polymerization kinetics suitable for high activity polymerization catalysis, DVB contents of 1 to 5 wt. % can provide less restricted polymerization kinetics suitable for lower activity polymerization catalysis. The term "high activity" relates to catalyst systems capable of activities greater than about $1 \times 10^7$ g-polymer/mol.-transition metal compound-atm-hr and "low activity" can be understood as below about that amount.

Organometallic transition metal compounds suitable as olefin polymerization catalysts by coordination or insertion polymerization in accordance with the invention will include the known transition metal compounds useful in traditional Ziegler-Natta coordination polymerization and as well the metallocene compounds similarly known to be useful in coordination polymerization, when such compounds are capable of catalytic activation by the cocatalyst activators described for the invention. These will typically include Group 4–10 transition metal compounds where the metal is in a d0 oxidation state, that is where the metal has its highest oxidation number, and wherein at least one metal ligand can be abstracted by the cocatalyst activators, particularly those ligands including hydride, alkyl and silyl. Ligands capable of abstraction and transition metal compounds comprising them include those described in the background art, see for example U.S. Pat. Nos. 5,198,401 and 5,278,119. Syntheses of these compounds is well known from the published literature. Additionally, where the metal ligands include halogen, amido or alkoxy moieties (for example, biscyclopentadienyl zirconium dichloride) which are not capable of abstraction with the activating cocatalysts of the invention, they can be converted via known alkylation reactions with organometallic compounds such as lithium or aluminum hydrides or alkyls, alkylalumoxanes, Grignard reagents, etc. See also EP-A1-0 570 982 for the reaction of organoaluminum compounds with dihalo-substituted metallocene compounds prior to addition of activating anion compounds. All documents are incorporated by reference for purposes of U.S. patent practice.

Additional description of metallocene compounds which comprise, or can be alkylated to comprise, at least one ligand capable of abstraction to form a catalytically active transition metal cation appear in the patent literature, for example EP-A-0 129 368, U.S. Pat. Nos. 4,871,705, 4,937,299, 5,324,800 EP-A-0-418 044, EP-A-0 591 756, WO-A-92/00333 and WO-A-94/01471. Such metallocene compounds can be described for this invention as mono- or biscyclopentadienyl substituted Group 4, 5, 6, 9, or 10 transition metal compounds wherein the ancillary ligands may be themselves substituted with one or more groups and may be bridged to each other, or may be bridged through a heteroatom to the transition metal. The size and constituency of the ancillary ligands and bridging elements are not critical to the preparation of the ionic catalyst systems of the invention but should be selected in the literature described manner to enhance the polymerization activity and polymer characteristics being sought. Preferably the cyclopentadienyl rings (including substituted cyclopentadienyl-based fused ring systems, such as indenyl, fluorenyl, azulenyl, or substituted analogs of them), when bridged to each other, will be lower alkyl-substituted ($C_1$–$C_6$) in the 2 position (without or without a similar 4-position substituent in the fused ring systems) and may additionally comprise alkyl, cycloalkyl, aryl, alkylaryl and or arylalkyl subtituents, the latter as linear, branched or cyclic structures including multi-ring structures, for example, those of U.S. Pat. Nos. 5,278,264 and 5,304,614. Such substituents should each have essentially hydrocarbyl characteristics and will typically contain up to 30 carbon atoms but may be hetero-atom containing with 1–5 non-hydrogen/carbon atoms, e.g., N, S, O, P, Ge, B and Si. All documents are incorporated by reference for purposes of U.S. patent practice.

Metallocene compounds suitable for the preparation of linear polyethylene or ethylene-containing copolymers (where copolymer means comprising at least two different monomers) are essentially any of those known in the art, see again EP-A-277,004, WO-A-92/00333 and U.S. Pat. Nos. 5,001,205, 5,198,401, 5,324,800, 5,308,816, and 5,304,614 for specific listings. Selection of metallocene compounds for use to make isotactic or syndiotactic polypropylene, and their syntheses, are well-known in the art, specific reference may be made to both patent literature and academic, see for example Journal of Organmetallic Chemistry 369, 359–370 (1989). Typically those catalysts are stereorigid asymmetric, chiral or bridged chiral metallocenes. See, for example, U.S. Pat. No. 4,892,851, U.S. Pat. No. 5,017,714, U.S. Pat. No. 5,296,434, U.S. Pat. No. 5,278,264, WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, Organometallics 1994, 13, 954–963, and "ansa-Zirconocene Polymerization Catalysts with Annelated Ring Ligands-Effects on Catalytic Activity and Polymer Chain Lengths", Brinzinger, H., et al, Organometallics 1994, 13, 964–970, and documents referred to therein. Though many above are directed to catalyst systems with alumoxane activators, the analogous metallocene compounds will be useful with the cocatalyst activators of this invention for active coordination catalyst systems, when the halogen, amide or alkoxy containing ligands of the metals (where occurring) are replaced with ligands capable of abstraction, for example, via an alkylation reaction as described above, and another is a group into which the ethene group —C=C— may insert, for example, hydride, alkyl, or silyl. All documents are incorporated by reference for purposes of U.S. patent practice.

Non-limiting representative metallocene compounds include monocyclopentadienyl compounds such as pentamethylcyclopentadienyltitanium isopropoxide, pentamethylcyclopentadienyltribenzyl titanium, dimethylsilyltetramethylcyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl; bridged biscyclopentadienyl compounds such as dimethylsilylbis (tetrahydroindenyl) zirconium dichloride; bridged bisindenyl compounds such as dimethylsilylbisindenyl zirconium dichloride, dimethylsilylbisindenyl hafnium dimethyl, dimethylsilylbis(2-methylbenzindenyl) zirconium dichloride, dimethylsilylbis(2-methylbenzindenyl) zirconium dimethyl; and the additional mono- and biscyclopentadienyl compounds such as those listed and described in U.S. Pat. Nos. 5,017,714, 5,324,800 and EP-A-0 591 756. All documents are incorporated by reference for purposes of U.S. patent practice.

Representative traditional Ziegler-Natta transition metal compounds include tetrabenzyl zirconium, tetra bis (trimethylsiylmethyl) zirconium, oxotris (trimethisilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride. The important features of such compositions for coordination polymerization are the ligand capable of abstraction by protonation and that ligand into which the ethene (olefinic) group can be inserted. These features enable the abstraction of the transition metal compound and the concomitant formation of the ionic catalyst composition of the invention.

Additional organometallic transition metal compounds suitable as olefin polymerization catalysts in accordance with the invention will be any of those Group 4–10 that can be converted by ligand abstraction into a catalytically active cation and stabilized in that active electronic state by a noncoordinating or weakly coordinating anion sufficiently labile to be displaced by an olefinically unsaturated monomer such as ethylene. Exemplary compounds include those described in the patent literature. U.S. Pat. No. 5,318,935 describes bridged and unbridged bisamido transition metal catalyst compounds of Group 4 metals capable of insertion polymerization of α-olefins. International patent publication WO 96/23010 describes diimine nickel and palladium compounds suitable for ionic activation and olefin polymerization. Transition metal polymerization catalyst systems from Group 5–10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. Bridged bis(arylamido) Group 4 compounds for olefin polymerization are described by D. H. McConville, et al, in *Organometallics* 1995, 14, 5478–5480. Synthesis methods and compound characterization are presented. Further work appearing in D. H. McConville, et al, *Macromolecules* 1996, 29, 5241–5243, described the bridged bis(arylamido) Group 4 compounds are active catalysts for polymerization of 1-hexene. Additional transition metal compounds suitable in accordance with the invention include those described in co-pending U.S. patent applications Ser. No. 08/798,401 filed Feb. 7, 1997, Ser. No. 08/803,687 filed Feb. 24, 1997, Ser. No. 08/806,181 filed Feb. 25, 1997, Ser. No. 60/041,258 filed Mar. 17, 1997, and WO 96/40806. Each of these documents is incorporated by reference for the purposes of U.S. patent practice.

Description of Synthesis of Support Bound Component(s)

Compound <u>A</u> can be prepared from the corresponding neutral amine defined in formula <u>B</u> below:

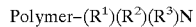

Polymer–$(R^1)(R^2)(R^3)N$                                                                 B (all of $R^1$, $R^2$ and $R^3$ defined above) by protonation by a at least 0.1 molar equivalent of an acid to a molar excess of an acid $H^+X^-$ followed by ion exchange with a salt of a compatible noncoordinating anion $M^+NCA^-$. In the most general terms $M^+$ can be any cationic species and $X^-$ any anionic species. It will be obvious to one skilled in the art that $H^+X^-$ should be chosen so as to have a lower $pK_a$ value than the conjugate acid of <u>B</u>. Additionally $M^+$ and $X^-$ should be chosen so that the byproduct of the ion exchange reaction, $M^+X^-$, is either soluble in the reaction solvent chosen or a compatible wash solvent. Representative non-limiting examples of suitable $X^-$ groups include halide, chlorate, perchlorate, triflate, perhaloborate, perhaloantimonate. Representative non-limiting examples of suitable $M^+$ groups include alkalai metal cations and ammonium cations. Finally it should be noted that the protonation of amines to yield ammonium salts is a technique well known in the art, simplifying the selection of $H^+X^-$. Preferably the product of <u>A</u> can be prepared in a single reaction by reacting the product of <u>B</u> with at least 0.1 molar equivalent of an ammonium salt of a compatible noncoordinating anion, $R^4R^5R^6NH^+NCA^-$. $R^4$, $R^5$, and $R^6$ are chosen from the same group of radicals as $R^1$, $R^2$ and $R^3$ above, with the additional criterion that they should be chosen so as to yield an ammonium salt with a lower $pK_a$ value than that of the product of <u>A</u> above. Methods to calculate $pK_a$ are well known in the art, and experimentally measured $pK_a$ are known for a variety of amines. This provides knowledge of general guiding principles on the part of those skilled in the art (e.g., aryl substituents lower $pK_a$ relative to alkyl substituents). See, for example, Perrin, D. D., Dempsey, B., Serjeant, E. P., pK$_a$ *Predictions for Organic Acids and Bases* (Chapman and Hall, London, 1981). Suitable solvents include aliphatic and aromatic hydrocarbons, ethers (including cyclic ethers) and halocarbons (both aliphatic and aromatic hydrocarbons).

The compound of B can be prepared from the direct copolymerization of the functionalized monomer with the monomeric precursors of the polymeric support of the invention. Specifically para-dimethylaminostyrene can be co-polymerized with styrene and divinylbenzene to yield the amine functionalized precursor of the invention catalyst. Preferably B can be prepared from a functionalized polymeric precursor of C:

Polymer-Y　　　　　　　　　　　　　　　　　　　　C wherein Y is a functional group known to be readily convertible to the amine functionality R$^1$R$^2$R$^3$N— described above. Methods for converting a wide variety of functional groups to the amine functionality of the invention are well known in the art, suitable functional groups include but are not limited to: alkanes, alkenes, alkyl halides, aryl halides, azides, nitro compounds, alcohols, aldehydes and ketones, nitriles, and organometalloids (for a general discussion see R. C. Larock, "Comprehensive Organic Transformations: a guide to functional group preparations", pgs. 385–438, (VCH publishers, 1989)).

Since there are many reactions of the types described above (synthesis of amines, protonation of amines, ion exchange) known in the art reactions which proceed with high selectivity and with essentially quantitative yields, the polymeric supported activators of the invention can be readily produced in essentially pure form, i.e., as single molecular structures without any significant amount of reaction by-products. Infrared spectroscopy provides a useful analytical method for monitoring the extent of the reaction to optimize reaction conditions, further assuring a high purity product. Specifically, commercially available chloromethylated polystyrene-co-divinylbenzene beads can be treated with a variety of dihydrocarbyl secondary amines to form a weakly basic anion exchange resin, corresponding to the invention precursor B. Reaction of these materials with dimethylanilinium tetrakis(perflurophenyl)borate yields a compound of type A, the protonated ammonium salt functionalized polymeric support of the invention.

Typically the olefin polymerization catalyst composition of the invention will be used where said the polymeric support contains 0.01–0.7 meq. transition metal compound per gram polymer, more preferably 0.03–0.3 meq. The polymeric supported cocatalyst activator of the invention will suitably contain 0.02 –0.9 meq. metal or metalloid atom per gram of polymer.

When using the supported ionic catalysts of the invention, the total catalyst system can additionally comprise one or more scavenging compounds. The term "scavenging compounds" is meant to include those compounds effective for removing polar impurities from the reaction environment. Impurities can be inadvertently introduced with any of the polymerization reaction components, particularly with solvent, monomer and catalyst feed, and adversely affect catalyst activity and stability. Impurities can result in decreased, variable or even elimination of catalytic activity. The polar impurities, or catalyst poisons include water, oxygen, metal impurities, etc. Preferably steps are taken before provision of such into the reaction vessel, for example by chemical treatment or careful separation techniques after or during the synthesis or preparation of the various components; some minor amounts of scavenging compound can still normally be used in the polymerization process itself.

Typically the scavenging compound will be an organometallic compound such as the Group 13 organometallic compounds of U.S. Pat. Nos. 5,153,157, 5,241,025 and WO-A- 93/14132, WO-A-94/07927, and that of WO-A-95/07941. Exemplary compounds include triethyl aluminum, triethyl borane, triisobutyl aluminum, methylalumoxane, isobutyl aluminoxane, and tri(n-octyl)aluminum. Those scavenging compounds having bulky or C$_8$–C$_{20}$ linear hydrocarbyl substituents covalently bound to the metal or metalloid center being preferred to minimize adverse interaction with the active catalyst. The amount of scavenging agent to be used with supported transition-metal cation-non-coordinating anion pairs is minimized during polymerization reactions to that amount effective to enhance activity.

Gas phase processes use supported catalysts and are conducted under gas phase conditions suitable for ethylene homopolymers or copolymers prepared by coordination polymerization. Illustrative examples may be found in U.S. Pat. Nos. 4,543,399, 4,588,790, 5,028,670, 5,352,749, 5,382,638, 5,405,922, 5,422,999, 5,436,304, 5,453,471, and 5,463,999, and International applications WO 94/28032, WO 95/07942 and WO 96/00245. Each is incorporated by reference for purposes of U.S. patent practice. Typically the processes are conducted at temperatures of from about −100° C. to 150° C., preferably from about 40° C. to 120° C., at pressures up to about 7000 kPa, typically from about 690 kPa to 2415 kPa. Continuous processes using fluidized beds and recycle streams as the fluidizing medium are preferred.

Slurry polymerization processes in which the immobilized catalyst systems of this invention may be used are typically described as those in which the polymerization medium can be either a liquid monomer, like propylene, or a hydrocarbon solvent or diluent, advantageously aliphatic paraffin such as propane, isobutane, hexane, heptane, cyclohexane, etc. or an aromatic one such as toluene. The polymerization temperatures may be those considered low, e.g., less than 50° C., preferably 0° C.–30° C., or may be in a higher range, such as up to about 150° C., preferably from 50° C. up to about 80° C., or at any ranges between the end points indicated. Pressures can vary from about 100 to about 700 psia (0.76–4.8 MPa. Additional description is given in U.S. Pat. Nos. 5,274,056 and 4,182,810 and WO 94/21962 which are incorporated by reference for purposes of U.S. patent practice.

In the process manner discussed above with the invention catalysts described in this application, unsaturated monomers, that is olefinically or ethylenically unsaturated monomers, may be polymerized so as to form polymer products having molecular weights (weight-average or M$_w$) from about 500 to about 3×10$^6$. Most typically, the polymer products will have an M$_w$ of from about 1000 to about 1.0×10$^6$. Suitable unsaturated monomers will include ethylene, C$_3$–C$_{20}$ linear or branched α-olefins, C$_4$–C$_{20}$ cyclic olefins, C$_4$–C$_{20}$ non-conjugated diolefins, C$_4$–C$_{20}$ geminally disubstituted olefins, C$_8$–C$_{20}$ styrenic olefins or C$_{20}$–C$_{100}$ α-olefin macromers. Preferably the polymer products will be any of polyethylene homopolymers and copolymers, particularly, polyethylene plastics, plastomers and elastomers; polypropylene homopolymers and copolymers, including atactic, syndiotactic or isotactic polypropylene; and cyclic olefin copolymers, particularly ethylene-norbomene copolymers.

Industrial Applicability

The supported catalyst according to the invention will be useful for industrial means of preparing addition or insertion polymers derived from olefinically unsaturated monomers. In particular the invention catalysts will be particularly suitable for use in gas phase or slurry processes, such as those practiced industrially worldwide, largely in accordance with the description above of these processes. Such polymer manufacturing processes are responsible for large amounts of plastic, thermoplastic elastomers and elastomers for films, fibers, packaging, adhesive substrates and molded articles in common use. Additionally the methodology of the invention can be readily extended to exploit combinatorial methods of catalyst evaluation. The polymeric supported activators are valuable intermediates for the construction and screening of libraries useful for optimization of new single-site catalyst systems capable of activation by protonation.

EXAMPLES

General

Unfunctionalized polystyrene-co-divinylbenzene beads (1% DVB, 200–400 mesh) were supplied by Biorad Laboratories (Hercules, Ca.) and washed carefully prior to use. Chloromethylated beads were acquired from Biorad (4.0 meq Cl/g 200–400 mesh; and 1.35 meq Cl/g, 200–400 mesh) and Acros Organics (Pittsburg, Pa.) (0.4 meq Cl/g, 100–200 mesh) and either used as received or subjected to a modification of the above washing procedure in which the initial heated washing stages were replaced by stirring for ½ h in aq. $K_2CO_3$ to avoid hydrolysis. $CH_2Cl_2$ was degassed by bubbling argon for ½ h prior to use. Other solvents and reagents were used as received. Low functionalization chloromethylated beads (0.15 meq Cl/g) were prepared by the method of J. T. Sparrow, Tet. Lett., 1975, 53, 4367. Slurry polymerizations were conducted in hexane, with hexene and tri-isobutylaluminum, in a stirred temperature-controlled reaction vessel under a constant ethylene head pressure. Abbreviations is these examples include the following: THF (tetrahydrofuran), Ph (phenyl), Me (methyl), Bn (benzyl).

$PS—CH_2N(CH_3)_2H]^+[B(C_6F_5)_4]^-$

Chloromethylated polystyrene-co-divinylbenzene beads with loadings of 0.15–4.0 meq. Cl/g were swollen in a solution of dimethylamine in THF (2M, Aldrich), and stirred for two days at room temperature. They were then rinsed with THF, THF/water 2:1, THF/water 1:2, water (twice), THF/water 1:2, THF/water 2:1, THF (twice) and dried under vacuum at 60° C. overnight. The aminated beads were treated with a 0.07 M solution of $[PhNMe_2H][B(C_6F_5)_4]$ in $CH_2Cl_2$ (1.5 equivalents) for 1.5 h, and then filtered and rinsed with $CH_2Cl_2$ (4 times) to yield beads with boron loadings of 0.15–1.1 meq. boron/g. Boron loadings were evaluated gravimetrically and by an IR assay. These beads were then treated with a variety of Group 4 metallocenes to generate the active catalytic species at loadings of 0.14–0.7 meq. catalyst/gram of beads. The metallocene loadings were approximated on the basis of quantitative reaction of metallocene with borated bead. Borated beads were typically treated with 3 equivalents of metallocene compound.

$PS—CH_2NPh(CH_3)H]^+[B(C_6F_5)_4]^-$

Chloromethylated polystyrene-co-divinylbenzene beads with loadings of 0.4–4.0 meq. Cl/g were swollen in neat N-methylaniline and stirred for two days at room temperature. They were then rinsed with THF, THF/water 2:1, THF/water 1:2, water (twice), THF/water 1:2, THF/water 2:1, THF (twice) and dried under vacuum at 60° C. overnight. The aminated beads were treated with a 0.07 M solution of $[Ph_2NH_2][B(C_6F_5)_4]$ in $CH_2Cl_2$ (1.5 equivalents) for 1.5 h, and then filtered and rinsed with $CH_2Cl_2$ (4 times) to yield beads with boron loadings of 0.36–0.87 meq. boron/g. Boron loadings were evaluated gravimetrically after careful drying.

Example 1

Catalyst A Preparation

In an inert atmosphere glove box, 0.500 grams of the protonated ammonium salt activator $PS—CH_2N(CH_3)_2H]^+$ $[B(C_6F_5)_4]^-$ with 0.67 mmol available functional group per gram of beads (i.e., 0.67 meq) prepared as discussed above was slurried in 35 mL of dry, oxygen free toluene at 25° C. under nitrogen in a 100 mL round bottom flask while stirring with a magnetic stirrer, followed by the addition of 0.609 g of bis(tetramethylcyclopentadienyl) hafnium dimethyl was added (as a solid) in small portions. The reaction was stirred for 1 h, and then the supported activator was isolated by vacuum filtration and washed with four 15 mL portions of dry, oxygen free toluene, then titrated with ca. 15 mL dry, oxygen free pentane. The supported catalyst was then then dried overnight in vacuo, yielding 0.522 g of finished catalyst (some material loss due to transfer), with a calculated loading of 0.52 mmol of transition metal per gram of finished catalyst.

Example 2

Catalyst B Preparation

Catalyst B was prepared in analogous manner to Catalyst A, but 0.125 grams of protonated ammonium salt activator $PS—CH_2N(CH_3)_2H]^+[B(C_6F_5)_4]^-$ with 0.27 mmol available functional group per gram of beads (i.e., 0.27 meq) was reacted with 0.057 g of bis(tetramethylcyclopentadienyl) hafnium dimethyl, yielding 0.113 g of finished catalyst (some material loss due to transfer), with a calculated loading of 0.24 mmol of transition metal per gram of finished catalyst.

Example 3

Catalyst C Preparation

Catalyst C was prepared in analogous manner to Catalyst A, but 1.016 grams of protonated ammonium salt activator $PS—CH_2N(CH_3)_2H]^+[B(C_6F_5)_4]^-$ with 0.67 mmol available functional group per gram of beads (i.e., 0.67 meq) was reacted with 1.138 g of bis(tetramethylcyclopentadienyl) hafnium dimethyl, yielding 1.200 g of finished catalyst (some material loss due to transfer), with a calculated loading of 0.52 mmol of transition metal per gram of finished catalyst. Solvent and wash amounts were doubled, and the reaction was carried out in a 250 mL round bottom flask.

Example 4

Preparation of Activator Beads with Reduced Borate Loading

One hundred grams of Chloromethylated polystyrene beads (200–400 mesh, 1% divinylbenzene cross-linked) with a chloride content of 1.00 meq/gram (i.e. 1.00 millimoles of available reactive functionality per gram of beads) were reacted with 800 mL of a 2.0 M THF solution of dimethylamine for 16 hours. Complete reaction was verified by IR spectroscopy. These beads were then rinsed and dried under vacuum for 16 hours at 60° C. 10.00 grams of these aminated beads were transferred to an inert atmosphere glove box and then swollen in toluene (150 mL). Dimethylanilinium tetrakis(perfluorophenyl)borate (0.806 g) dissolved in 100 mL of warm toluene was added to the swollen beads while stirring the suspension vigorously. After one hour the solution was filtered and washed with two 100 mL portions of toluene, slurried in toluene (100 mL) for 15 minutes, washed with two additional 100 mL portions of toluene, slurried in pentane (100 mL) for 15 minutes, washed with two 100 mL portions of pentane, and finally dried under vacuum for 16 hours at 60° C., to yield beads with a calculated loading of 0.09 meq/gram.

Example 5

Catalyst D Preparation

Catalyst D was prepared in analogous manner to Catalyst A, but using 2.00 g of the reduced loading protonated ammonium salt activator PS—$CH_2N(CH_3)_2H]^+[B(C_6F_5)_4]^-$ with an assumed 0.09-mmol available functional group per gram of beads (i.e., 0.09 meq) prepared in Example 4. The beads were swollen/slurried in 50 mL toluene and reacted with 0.90 g of bis(1,3 butyl-methyl-cyclopentadienyl) zirconium dimethyl, stirred for 2 h and then filtered and washed with two 30 mL portions of toluene, then slurried in 50 mL pentane for 15 minutes, filtered and dried in vacuo for 12 hours at room temperature, yielding 1.92 g of pale yellow finished catalyst (some material loss due to transfer), with a calculated loading of 0.09 mmol of transition metal per gram of finished catalyst.

Example 6

Catalyst E Preparation

Catalyst E was prepared exactly as Catalyst D, except that 0.151 g of dimethylsilylbis(tetrahydroindenyl) zirconium dimethyl was used instead of the bis(1,3 butyl-methyl-cyclopentadienyl) zirconium dimethyl of Example 5. 1.77 g of off-white finished catalyst (some material loss due to transfer), with a calculated loading of 0.09 mmol of transition metal per gram of finished catalyst was isolated.

Example 7

Catalyst F Preparation

Catalyst F was prepared in analogous manner to Catalyst A, but 50.00 grams of protonated ammonium salt activator PS—$CH_2N(CH_3)_2H]^+[B(C_6F_5)_4]^-$ (beads were 200–400 mesh and 2% divinylbenzene crosslinked) with 0.6 mmol available functional group per gram of beads (i.e., 0.6 meq) was reacted with 12.00 g bis(1,3 butyl-methyl-cyclopentadienyl) zirconium dimethyl, yielding 55.7 g of orange finished catalyst (some material loss due to transfer), with a calculated loading of 0.5 mmol of transition metal per gram of finished catalyst. Solvent and wash amounts were increased by a factor of ten, and the reaction was carried out in a 1000 mL round bottom flask.

Example 8

Slurry-Phase Ethylene-Hexene Polymerizations in hexane

Polymerization was performed in the slurry-phase in a 1-liter autoclave reactor equipped with a mechanical stirrer, an external water jacket for temperature control, a septum inlet and a regulated supply of dry nitrogen and ethylene. The reactor was dried and degassed thoroughly at 115° C. Hexane (400 cc) was added as a diluent, 0.6 cc of a 1.25 M triisobutyl aluminum solution in pentane was added as a scavenger, using a gas tight syringe, and 45 mL of hexene via cannula. The reactor was charged with 75 psig (5.17 bar) of ethylene at 40° C. A 10 cc stainless steel bomb was charged with 0.060 g of Catalyst A (bomb loaded in inert atmosphere glove box) and affixed to the reactor with a swagelock fitting. The catalyst was then introduced into the reactor. The polymerization was continued for 30 minutes while maintaining the reaction vessel within 3° C. of 40° C. and 75 psig ethylene pressure (5.17 bar) by constant ethylene flow. The reaction was stopped by rapid cooling and venting. 33.0 grams of ethylene-hexene copolymer were recovered. The polyethylene had a weight average molecular weight of 99,600, a molecular weight distribution of 2.9, and contained 21% hexene by weight. Bulk polymerization activity was calculated by dividing the yield of polymer by the total weight of the catalyst charge by the time in hours and by the absolute monomer pressure in atmospheres to yield a value of 2189 g PE/g catalyst—h—atm. The specific polymerization activity was calculated by dividing the yield of polymer by the total number of millimoles of transition metal contained in the catalyst charge by the time in hours and by the absolute monomer pressure in atmospheres, yielding a value of 422 g PE/mmol catalyst—h—atm. Similar polymerizations were carried out with Catalysts B and C, with both shorter and longer run times (all other conditions the same). Pertinent data is summarized in Table 1.

TABLE 1

Hexane Slurry Polmerization Data

| Catalyst | loading (meq) | Run Time (min) | Yield (g) | Bulk Prod. | Specific Activity | GPC $M_w$ (daltons) | MWD | hexene (wt %) |
| --- | --- | --- | --- | --- | --- | --- | --- | --- |
| A | 0.52 | 30 | 33.5 | 2189 | 422 | 99,600 | 2.9 | 21.3 |
| B | 0.24 | 120 | 111.7 | 1520 | 629 | 188,700 | 7.3 | 14.8 |
| C | 0.52 | 60 | 51.1 | 1002 | 193 | 147,700 | 4.3 | 16.1 |

Example 9

Slurry-Phase Ethylene-Hexene Polymerizations in isobutane

Polymerization was performed in the slurry-phase in a 1-liter autoclave reactor equipped with a mechanical stirrer, an external water jacket for temperature control, a septum inlet and a regulated supply of dry nitrogen and ethylene. The reactor was dried and degassed thoroughly at 115° C. Isobutane (400 cc) was added as a diluent, 0.6 cc of a 1.25 M triisobutyl aluminum solution in pentane was added as a scavenger, using a gas tight syringe, and varying amounts of hexene via cannula (35 mL for Catalyst D, 15 mL for Catalyst E). The reactor was charged with 75 psig (5.17 bar)

of ethylene at 60° C. (i.e., 75 psig ethylene overpressure was applied on top of diluent vapor pressure). A 10 cc stainless steel bomb was charged with the desired catalyst (bomb loaded in inert atmosphere glove box) and affixed to the reactor with a swagelock fitting. The catalyst was then introduced into the reactor. The polymerization was continued for 30 minutes while maintaining the reaction vessel within 3° C. of 60° C. and 75 psig ethylene pressure (5.17 bar) by constant ethylene flow. The reaction was stopped by rapid cooling and venting. Polymerization activities were calculated as in Example 8 Pertinent data is summarized in Table 2.

TABLE 2

Isobutane Slurry Polmerization Data

| Catalyst | loading (meq) | Cat Charge (g) | Run Time (min) | Yield (g) | Bulk Prod. | Specific Activity | GPC $M_w$ (daltons) | MWD | hexene (wt %) |
|---|---|---|---|---|---|---|---|---|---|
| D | 0.09 | .30 | 120 | 109.2 | 36 | 410 | 74,500 | 2.4 | 8.6 |
| E | 0.09 | .25 | 36 | 29.9 | 47 | 520 | 72,300 | 2.4 | 15.9 |

In all slurry polymerization examples, the product is isolated in the form of discrete free flowing spherical beads of high bulk density (>0.4 g/cc), with a similar distribution of sizes to that of the starting polystyrene beads. In the case of Catalyst B, which was run for two hours, these beads were of millimeter dimension. This suggests that each polymer bead is the result of polymerization from an individual catalytic bead, with essentially no particle fracture. Analysis of ethylene uptake data indicates shows a controlled increase in uptake rate for the first ca. 15 min of the polymerization, and this rate is essentially maintained thereafter (rate is still >90% of maximum value after 2 hours). These observations attest to the long active life of the catalysts of the invention. The broadened MWD in the 2 hour polymerization in Table 1 can be understood in terms of the dramatic change in hexene concentration over the course of the reaction (>50% of the hexene is consumed), while the ethylene concentration remains essentially constant.

A sample of supported catalyst F described above was used for gas phase ethylene/1-hexene copolymerization studies as described below. A continuous fluid bed gas-phase reactor operated at 300 psig (20.7 bar) total pressure, 175° F. (79.4° C.) reactor temperature and 0.7 ft/s (21 cm/s) cycle gas velocity was used for determining catalyst efficiency, ability to incorporate and molecular weight capability co-monomer such as 1-hexene. No scavenger was fed into the reactor during the polymerization. Catalyst was fed at a rate sufficient to maintain the desired production rate. A summary of the process data is included in Table 2. After at least three bed turnovers polymer samples were collected and analyzed.

TABLE 3

PROCESS DATA

| | |
|---|---|
| $H_2$ conc. (ppm) | 53 |
| $C_6/C_4$ conc. (mol %) | 0.62 |
| $C_2$ conc. (mol %) | 39.8 |
| $H_2/C_2$ Ratio (X $10^{-4}$) | 1.3 |
| $C_6/C_2$ Ratio | 0.016 |
| Reactor Temp (°F./°C.) | 175 79.4 |
| Avg. Bed weight (g) | 1487 |
| Production (g/h) | 509 |

TABLE 3-continued

| | |
|---|---|
| Residence Time (h) | 2.9 |
| Productivity · (g/g) - MB[1] | 7090 |
| Total Bed Turnovers (on spec) | 2.7 |
| POLYMER DATA | |
| MI (ASTM D 1238) | 42.53 |
| Density (g/cm) | .923 |

[1]MB = Material Balance

Example 10

Catalyst G Preparation

Catalyst G was prepared in analogous manner to Catalyst A, but 5.04 grams of protonated ammonium salt activator PS—$CH_2N(CH_3)_2H]^+[B(C_6F_5)_4]^-$ with 0.3 mmol available functional group per gram of beads (i.e., 0.6 meq) was reacted with 0.628 g of dimethylsilylbis(tetrahydroindenyl) zirconium dimethyl, yielding 4.03 g of yellow finished catalyst (some material loss due to transfer), with a calculated loading of 0.27 mmol of transition metal per gram of finished catalyst. Solvent and wash amounts were doubled, and the reaction was carried out in a 250 mL round bottom flask.

Example 11

Bulk-Phase Propylene Polymerization using Catalyst G

Polymerization was performed in the slurry-phase inl a 1-liter autoclave reactor equipped with a mechanical stirrer, an external water jacket for temperature control, a septum inlet and a regulated supply of dry nitrogen and propylene. The reactor was dried and degassed thoroughly at 115° C. Propylene (400 mL) was added along with 0.6 cc of a 1.25 M triisobutyl aluminum solution in pentane added as a scavenger, using a gas tight syringe. A 10 cc stainless steel bomb was charged with 0.40 g of Catalyst G (bomb loaded in inert atmosphere glove box) and affixed to the reactor with a swagelock fitting. The catalyst was then introduced into the reactor. The polymerization was continued for 60 minutes while maintaining the reaction vessel at 40° C. The reaction was stopped by rapid cooling and venting. 39.8 grams of isotactic polypropylene were recovered. Bulk polymerization activity was calculated by dividing the yield of polymer by the total mmol of transition metal contained in the catalyst and by the time in hours, to yield a value of 99.5 g i-PP/g catalyst-hour. This example demonstrates the use of a chiral bridged metallocene to prepare isotactic polypropylene (i-PP).

The following is claimed:

1. An olefin polymerization catalyst composition comprising the reaction product of a) an essentially hydrocarbon polymeric support having i) a surface area of from about 1 to less than or equal to 10 $m^2/g$ and ii) a plurality of covalently bound protonated ammonium salts of noncoordinating anions, and b) an organometallic transition metal compound having ancillary ligands, at least one labile ligand capable of abstraction by protonation by said ammonium salt and at least one labile ligand into which an olefinic monomer can insert for polymerization, said protonated ammonium salts being homogeneously dispersed within the polymeric support.

2. The catalyst composition of claim 1 wherein said organometallic transition metal compound is a monocyclopentadienyl ligand-containing Group 4 metal compound.

3. The catalyst composition of claim 1 wherein said organometallic transition metal compound is a biscyclopentadienyl ligand-containing Group 4 metal compound.

4. The catalyst composition of claim 1 wherein said organometallic transition metal compound is a Group 4–10 metal compound other than a monocyclopentadienyl or biscyclopentadienyl ligand-containing Group 4 metal compound.

5. The catalyst composition of claim 1 wherein said noncoordinating anion is one derived from an organoboron or organoaluminum compound.

6. The catalyst composition of claim 1 wherein said organometallic transition metal compound has an activity level for olefin polymerization of greater than $1 \times 10^7$ g-polymer/mol.-transition metal compound-atm-hr.

7. The olefin polymerization catalyst composition of claim 1 wherein said polymeric support contains 0.01–0.7 meq. transition metal compound per gram polymer.

8. An olefin polymerization process comprising contacting one or more ethylenically unsaturated olefins under suitable polymerization conditions with the catalyst composition according to claim 1.

9. The process according to claim 8 conducted under gas phase polymerization conditions.

10. The process according to claim 8 conducted under slurry polymerization conditions.

11. The process according to claim 9 wherein said olefin is selected from the group consisting of ethylene, $C_3$–$C_8$ α-olefins, and combinations thereof.

12. The process according to claim 11 wherein said olefin is selected from the group consisting of ethylene, propylene, 1-butene, 1-hexene, 1-octene, and combinations thereof.

13. The process according to claim 10 wherein said olefin is selected from the group consisting of ethylene, $C_3$–$C_8$ α-olefins, and combinations thereof.

14. The process according to claim 13 wherein said olefin is propylene, optionally with ethylene.

15. The process according to claim 10 wherein said olefin is selected from ethylene, cyclic olefins, and styrenic olefins, and combinations thereof.

16. The olefin polymerization catalyst composition of claim 7 where said support contains 0.03–0.3 meq. transition metal compound per gram polymer.

* * * * *